(12) United States Patent
Steinert et al.

(10) Patent No.: US 7,933,083 B2
(45) Date of Patent: Apr. 26, 2011

(54) DIAPHRAGM DEVICE

(75) Inventors: Jörg Steinert, Jena (DE); Thomas Mehner, Kleinromstedt (DE); Volker Gerstner, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 12/767,965

(22) Filed: Apr. 27, 2010

(65) Prior Publication Data

US 2010/0259844 A1    Oct. 14, 2010

Related U.S. Application Data

(62) Division of application No. 11/330,386, filed on Jan. 12, 2006, now Pat. No. 7,706,090.

(30) Foreign Application Priority Data

Dec. 8, 2005    (DE) .......................... 10 2005 059 337

(51) Int. Cl.
*G02B 5/22* (2006.01)

(52) U.S. Cl. .................. 359/889; 359/885; 359/890

(58) Field of Classification Search ................ 359/738, 359/739, 722, 885, 889, 890, 891, 892
See application file for complete search history.

(56) References Cited

U.S. PATENT DOCUMENTS

| 4,714,823 A | 12/1987 | Spruck et al. |
| 5,781,331 A | 7/1998 | Carr et al. |
| 7,400,458 B2 | 7/2008 | Farr |
| 2005/0045812 A1 | 3/2005 | Birk et al. |
| 2006/0291031 A1 | 12/2006 | Boehm et al. |

FOREIGN PATENT DOCUMENTS

| DE | 3535749 A1 | 10/1986 |
| DE | 19861105 A1 | 3/2003 |
| DE | 10340020 | 3/2005 |
| DE | 10352040 A1 | 7/2005 |

*Primary Examiner* — Jack Dinh
(74) *Attorney, Agent, or Firm* — Jacobson Holman PLLC

(57) ABSTRACT

A diaphragm device with which individual wavelengths or ranges of wavelengths in the path of a beam of spectrally dispersed light can be suppressed. Such a diaphragm device comprises at least one array of diaphragms, wherein the individual diaphragms of the array are arranged in a definite relation to each other and may be coupled in the path of the beam and each diaphragm of the array in the coupled state is arranged in a given relation to an individual wavelength or a range of wavelengths.

17 Claims, 4 Drawing Sheets

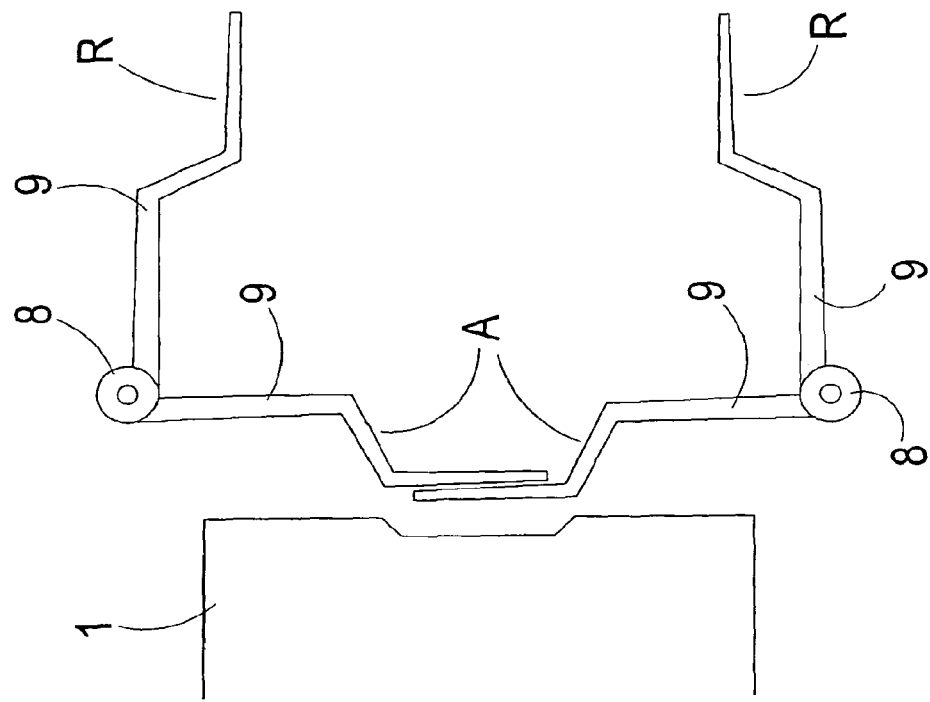
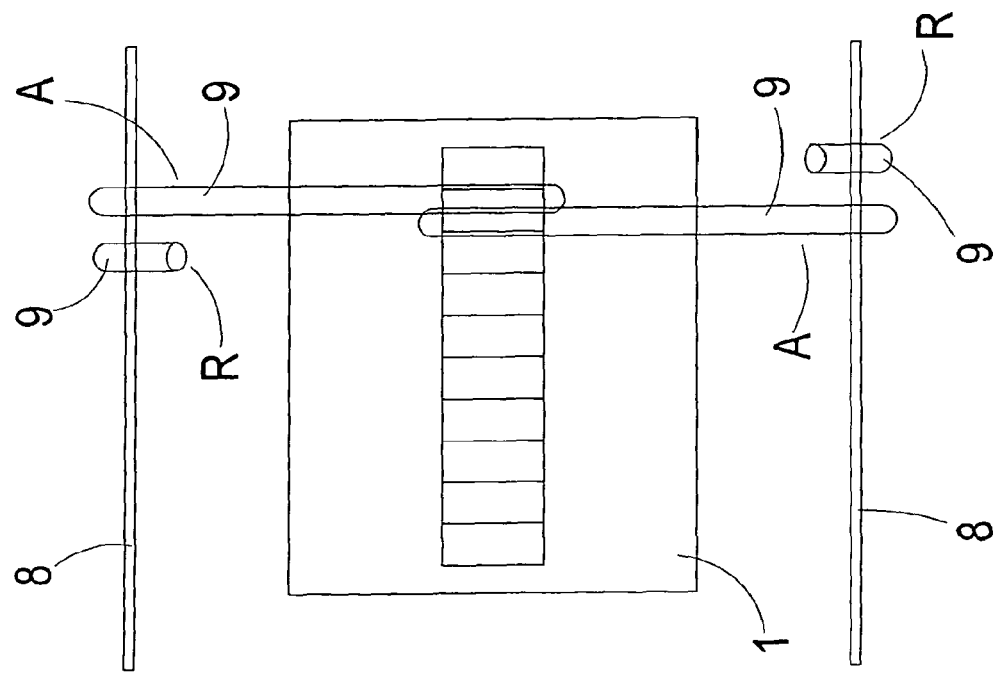
Fig.4a
Fig.4b

DIAPHRAGM DEVICE

CROSS-REFERENCE TO RELATED APPLICATIONS

The present patent application is a division of application Ser. No. 11/330,386, filed Jan. 12, 2006, now U.S. Pat. No. 7,706,090 which is incorporated herein by reference in its entirety.

BACKGROUND OF THE INVENTION

1. Field of the Invention

The invention relates to a diaphragm device, with which individual wavelengths or ranges of wavelengths in the path of a beam of spectrally dispersed light are suppressed, and is related to the problem of the wavelength selectivity, in particular when using different light sources, or such sources which emit light with a wide range of wavelengths.

2. Description of Related Art

Various diaphragm devices for selective detection or suppression of individual wavelengths in spectrally dispersed light are known in the prior art. The spectrum of the light coming from the sample is at first dispersed, for instance, by means of a prism or a grating, and then falls on the diaphragm device. Of this, individual wavelengths or wavelength ranges are not transmitted; the remaining light passes through the diaphragm and falls in general on a spectrum resolving detector. Alternatively, the spectrum of the transmitted light can also be unified again and deflected to an individual detector, which registers only the intensity. Such spectrally selective diaphragms are used, for example, in fluorescence microscopy or fluorescence spectroscopy. In this method, the sample is marked with dyes. The dyes are excited to fluoresce by means of irradiation with laser light with specific wavelengths. However, a not insignificant part of the excitation light is also reflected or scattered by the sample and reaches into the path of the detection beam. With the help of a wavelength selective diaphragm, one can filter out the excitation light before the detection, so that the measurement is not falsified as a result of it.

The laser systems according to the prior art used in fluorescence microscopy emit only a few fixed wavelengths. For these wavelengths, individual diaphragms can be arranged in fixed positions before the detector. Recently, however, use of broadband emitting and variable broadband laser light sources are gaining importance, because with these sources, a larger spectrum of methods for examination with one and the same microscope is available, without necessitating replacement of the modules. Use of such systems also requires some flexibility in the selection of the excitation wavelengths, whereby these wavelengths must be suppressed before the detection. A diaphragm device with which this type of flexible filtering can be achieved is described, for example, in U.S. 2005/045812 A1. In FIG. 6 of that publication, masks, which suppress a certain spectral range, and which are displaceable parallel to the surface of the detector arrays, are disclosed. Thereby, these masks can be moved in three translational and three rotational degrees of freedom. Such a high number of degrees of freedom requires a complicated mechanical and motor system, which is not described in further detail in the mentioned publication.

SUMMARY OF THE INVENTION

The aim of this invention is therefore to develop a wavelength selective diaphragm device, which exhibits high flexibility in the selection of the wavelengths or the ranges of wavelengths, whereby this flexibility must also be achieved with as little expense as possible for the mechanical system necessary for the movement of the diaphragms.

This problem is solved in the case of the diaphragm devices of the kind described at the outset, in that the device comprises at least one array of diaphragms, whereby the individual diaphragms of the arrays are arranged in a mutually defined relation with respect to each other and are arranged together in the path of the beam and in the coupled state, each diaphragm of the array is arranged in a given relation to an individual wavelength or a range of wavelengths.

Which wavelengths or ranges are suppressed by an individual diaphragm depends on the position of the diaphragm with respect to the detector, if it involves a spectral resolution detector. However, it is also crucial which wavelength range is deflected onto the diaphragm. If a grating is used for the spectral splitting, then it can, for example, be rotated, so that a different wavelength range or a different wavelength is deflected onto the diaphragm. A similar variation is possible by using a movable prism as the element for spectral dispersion.

The individual diaphragms are thereby arranged together in the beam path with a defined relation with respect to each other. For example, if the array has a row of diaphragms, then, for instance, all diaphragms in that array along the row have a fixed mutual distance. Preferable are the individual diaphragms of the arrays along a given direction in a defined relation to each other. In this way, it is an advantage if the given direction is essentially perpendicular to the optical axis and parallel to a direction in which the light is spectrally dispersed. The detector can then be arranged directly behind it. Obviously other directions are possible, for example, a sloping arrangement in a beam path that is adapted accordingly. The given direction thereby lies preferably in the plane of the surfaces of the diaphragms, that is, of the diaphragm screens, which indicate the direction of the incident light.

In a preferred embodiment, the diaphragms are arranged in the array with a fixed position, and the array itself can be coupled in the path of the beam. In this case, a structured plate can be provided as an array of diaphragms that can be designed as a sheet metal plate with etched-in openings for the diaphragms. This plate can then be moved, for example, by pushing in or screwing in, into the path of the beam before the detector array. Thereby, it is obviously also possible to select from a reservoir of several such plates, so as to enable adjustment to the illumination light. These plates can be pushed in the detector from above, below or from the sides, and can be moved past it.

Alternatively, or in addition to the structured plate, a structured foil with built-in openings for the diaphragms can be provided as the array of the diaphragms. This foil can then be moved in front of the detector. This can happen, for example, by means of rolls, on which the foils can be unwound on one side of the detector and wound up on the other side of the detector. Thereby, at the ends of the foil, an area is provided, which enables it to use the detector without the array of the diaphragms. Preferably such rollable foil contains several arrays of diaphragms.

Depending on the requirement or the selection of the illumination light, a corresponding structured foil can be rolled before the detector. These rolls can be actuated mechanically or electromagnetically. For the insertion of the structured plate into the path of the light beam, a mechanical or an electromechanical drive is also useful. Finally, several arrays of diaphragms can be provided, which can be introduced successively one after another into the path of the beam. This can then be of advantage, if, for example, in the first fluorescence microscopic examination, two excitation wavelengths are to be suppressed, then two other light sources are to be switched in, and their excitation wavelengths are also to be suppressed.

In an another preferred embodiment of the invention, the array of the diaphragms has a fixed position with respect to the beam path, preferably with respect to the given direction, and, in particular, outside the beam path. The diaphragms of the arrays can however be individually coupled in the path of the beam, so that they cover, depending on the requirement, one or more areas or channels of the detector. In this case, the array is, for example, perpendicular to the optical axis and parallel to the direction in which the light is spectrally dispersed. The detector is located, for example, directly behind. In this way, it is of advantage if the diaphragm is adapted to the dimensions of the detector. If, for example, the detector has 32 detection channels, then the diaphragm array also has 32 individual diaphragms. Each diaphragm covers exactly one detection channel. Obviously a subdivision into smaller ranges, such as 64 ranges, is possible. With that, a still finer selection of the wavelength ranges can be done, which is especially of advantage if the excitation and the detection wavelengths lie closely near each other, and thus can fall in a single detection channel. Naturally a diaphragm can also cover several detection channels at the same time.

The diaphragms can be so designed so that they can be pushed into the path of the beam. Thus, they can be arranged, for example, in a resting position above or below the detector in the beam path and can then be driven mechanically or electromechanically, like tongues before the channels of the detector. In this case, a guide for the diaphragms can also be provided, whereby it makes sense if the guide for such a diaphragm lies before the marginal region of the associated detection channel.

In the case of this design, it is preferable if a second array of diaphragms is provided, whose diaphragms are arranged in such a manner that in the pushed-in state in the beam path, each one of the diaphragms of the second array covers the marginal area of the diaphragm screen of at least one of the diaphragms of the first array. Each individual diaphragm is thereby preferably oriented parallel to the surface of the detector. In this way, one can achieve in a relatively simple manner that no scattered light from the border regions of a detection channel enters into the detector, because complete covering of the border region with only a single array is possible in principle, but it is very complicated to achieve it mechanically.

In another embodiment according to the invention, the array of the diaphragms is arranged in the beam path, whereby adjustable optical shutters are provided as the diaphragms in this case. As the optical shutters, preferably Liquid Crystal Displays (LCDs) or Digital Micro Devices (DMDs) are provided. These optical shutters are then switched in by means of the adjustment control. By switching in the shutter, the light can either be directed to the detector, or in the other switching state, the light can be obstructed from falling on the detector.

In another, preferable embodiment, the diaphragms of the array are arranged along an axis in at least a partially rotatable manner about that axis. Thereby the axis runs parallel to the given direction, that is, for example, perpendicular to the optical axis or parallel to the surface of the detector array. The diaphragms of the arrays are preferably mounted on a common frame, which serves the purpose of fixing and guiding the diaphragms. The frame is preferably supported on one side rotatably about the axis. For each individual diaphragm, it is meaningful to provide a resting position, in which the diaphragm is not in the path of the beam. Further, for each diaphragm, an operating position is provided, in which the diaphragm is in the path of the beam. Finally, means are provided, which fix the diaphragms both in the resting position, as well as in the operating position.

For example, to fix each one of the diaphragms in the resting position, an electromagnetic holder can be provided. The latter can be connected with a frame. In the resting position, the frame, together with the diaphragms, is outside the path of the beam. In order to bring the diaphragms into the operating position, that is, in front of the detector array, the frame with the diaphragms can be rotated so that the diaphragms cover the detector array. This rotation, for example, can be limited by a stop. Thereafter, the holder is released for a previously determined selection of diaphragms. The frame swings back after that and the diaphragms detached from the holder remain in the path of the beam, while the other diaphragms together with the frame are again swiveled out of it. If a different selection of diaphragms is to be arranged before the detector array, this process is repeated and the electromagnetic holders are switched in accordingly. In this manner, it is possible to rapidly switch in and out different arrangements of diaphragms.

In order to fix each diaphragm in the operating position, a spring element is preferably provided, whose state of elastic tension in the resting position is higher than in the operating position. The movement from the resting position to the operating position can then be actuated solely by releasing the electromagnetic holder. Due to the elastic force, the corresponding diaphragm is pressed out from the resting position into the operating position. In order to limit the path of the diaphragm, a stop that fixes the diaphragm before the detector can be provided.

In an especially preferable embodiment, the diaphragm device is provided with a spring element for the stabilization of each diaphragm. The spring element has a state of elastic tension that is greater when passing from the resting position to the operating position and back than when in these two positions. In the resting position as well as in the operating position, one diaphragm is held stable, because, for the movement from these positions, a force is necessary in each case. The movement from the resting position to the operating position and back can take place by means of a frame, which is rotatably supported. As the spring elements, leaf springs, which press against a rest, can be provided.

In this case also, it can be an advantage if a second array of diaphragms is provided, whose diaphragms are so arranged that in the operating position, each of the diaphragms of the second array covers the marginal area of the diaphragm screen of at least one of the diaphragms of the first array.

The surfaces in the path of the beam pointing in the direction of the incidence of light can be absorptive or reflective. In the latter case, it is an advantage if a beam trap is provided for capturing the light reflected by the diaphragm's screens. Alternatively, that light can also be processed further.

BRIEF DESCRIPTION OF THE DRAWINGS

The invention is explained further in the following on the basis of a few exemplary embodiments. Shown in the corresponding drawings are:

FIG. 4a is a schematic top view of a detector with two diaphragm arrays, in which the diaphragms are rotatably supported and are singly couplable in the beam path, FIG. 4b is a schematic side view of a detector with two diaphragm arrays, in which the diaphragms are rotatably supported and are singly couplable in the beam path.

DETAILED DESCRIPTION OF THE INVENTION

Figure 1:
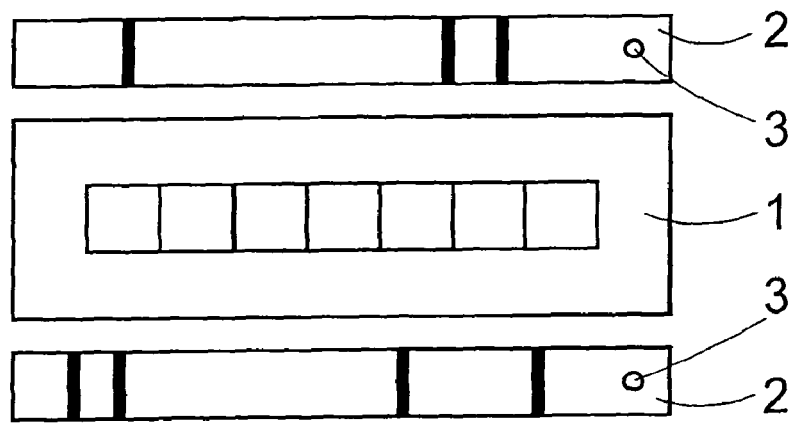
FIG. 1 is a schematic view of a detector array with two insertable diaphragm arrays.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

In FIG. 1, the top view of a detector 1 is shown. Above and below the detector 1, there is a structured plate 2 on each side in which the individual diaphragms are denoted by black bars. The structured plates 2 can be designed as metal plates or foils.

A window 3 in each structured plates 2 can serve the purpose of fixing and displacement, particularly for the purpose of alignment, of the structured plates 2. The structured plates 2 are pushed one at a time or in combination into the path of the beam in front of the detector 1.

Figure 2:
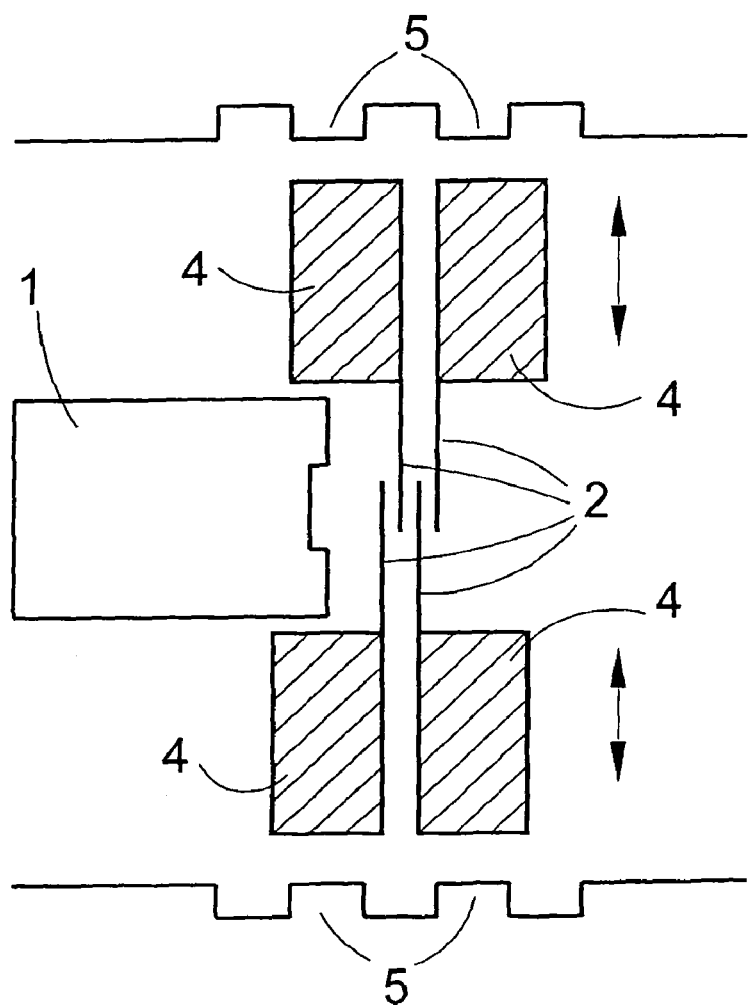
FIG. 2 is a schematic side view of the detector with diaphragm arrays arranged before the detector.

In FIG. 2, a schematic side view of four structured plates 2 coupled in the beam path before the detector is shown. The four structured plates 2 are arranged successively one after another. By means of the actuating elements 4, the plates are coupled with the drives 5. The structured plates 2 are moved into or out of the path of the beam in this manner, as indicated by the arrows. The actuation can take place mechanically by means of a screw thread, or it can take place electromagnetically.

Figure 3:
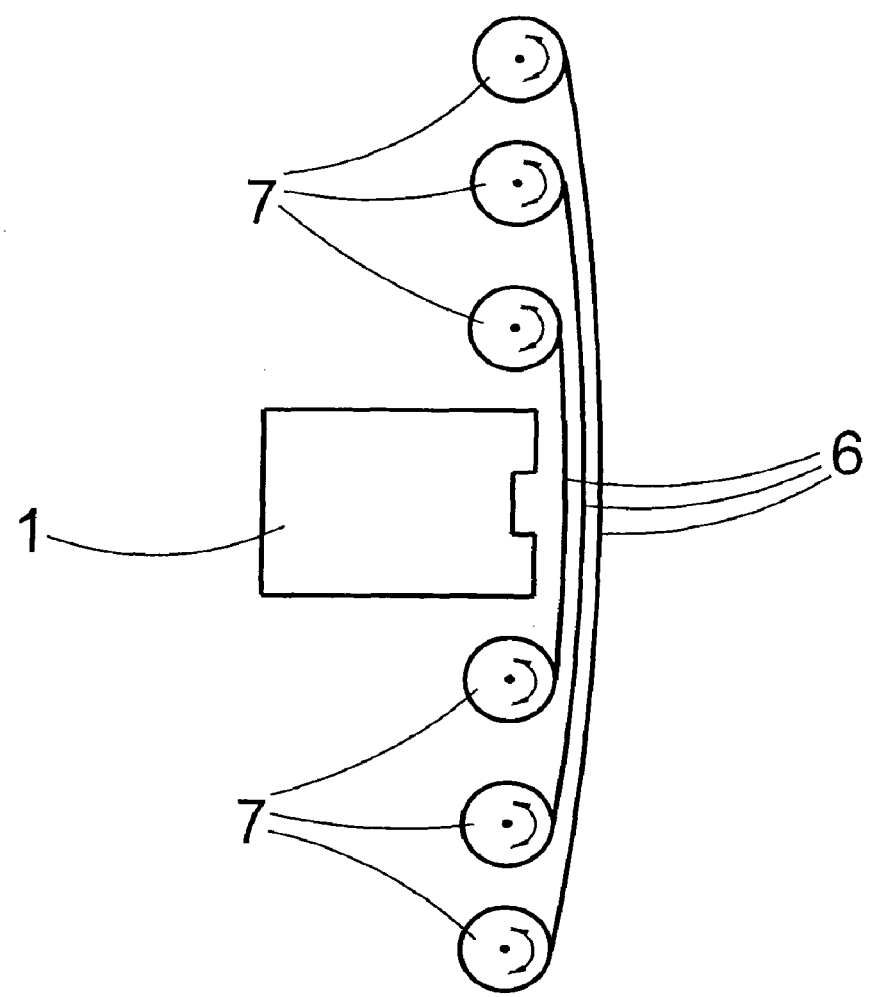
FIG. 3 is a schematic view illustrating the use of rollable foils as diaphragm arrays.

Another embodiment of the invention is schematically shown in FIG. 3. In it, the diaphragm arrays are built using foils 6, which are moved on the rolls 7 past the detector 1. Here also, several foils 6 are arranged one after another.

In FIGS. 4a and 4b, a detector is schematically shown with two diaphragm arrays, wherein the diaphragms are held on a rotatably supported frame 8. Shown are the ends of two diaphragms 9 in the resting position R and two diaphragms 9 in the operating position A. Thereby, the diaphragm screens of the diaphragms 9 overlap in order to achieve the selection in a light-tight manner. FIG. 4a shown the top view of the detector, FIG. 4b shows the side view of the same arrangement. The individual diaphragms 9 are variably switched on and off. Each part region of the detector can be covered or left open independently of the other regions. The diaphragms 9, which are meant to overlap each other, lie alternately on one side and on the other side of the detector; they are rotated to bring them into their respective positions.

Figure 5:
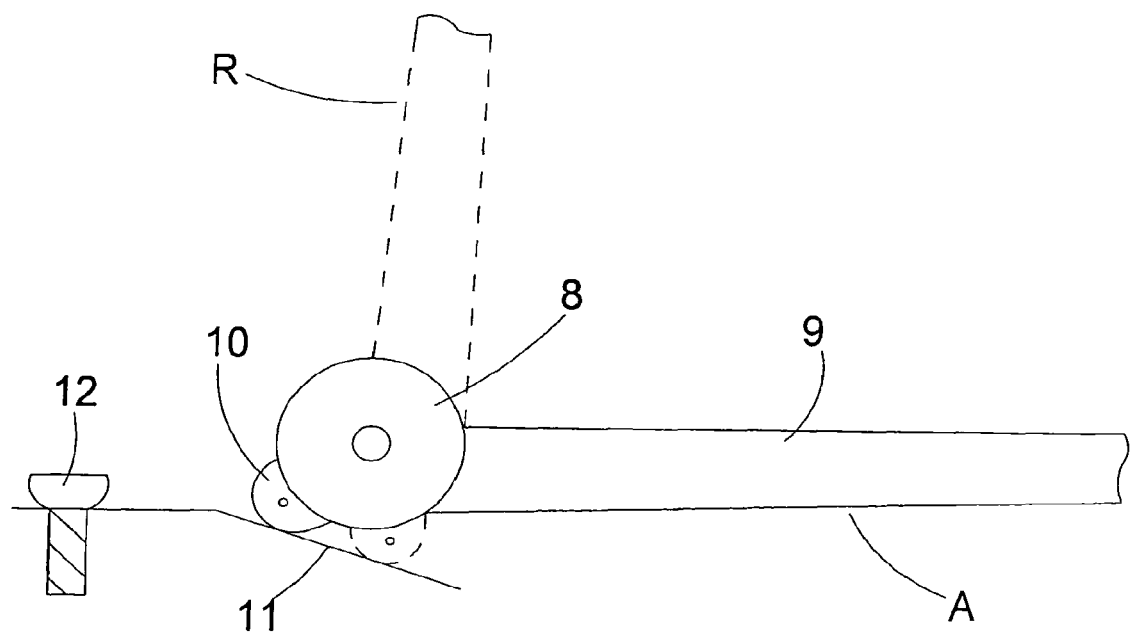
FIG. 5 is a schematic view of a stabilized diaphragm in the operating or the resting position.

FIG. 5 schematically illustrates how the diaphragms of FIGS. 4a and 4b can be stabilized in a bistable manner in the resting position R or in the operating position A. Shown is a diaphragm 9 in the operating position A. The diaphragm 9 is provided with a catch 10. The catch 10 lies on a leaf spring 11, which is held by a screw 12. In order to move the diaphragm 9 from the operating position A into the resting position R, the elastic force, with which the leaf spring 11 presses against the catch 10, is overcome. Finally, the diaphragm 9 assumes its resting position R, which is shown here with a dashed line.

The switching in of the diaphragms 9 is achieved by rotating the frame 8. If, for example, all the diaphragms 9 are switched in the operating position A before the detector 1, they are at first turned away from the detector 1. This can be achieved, for instance, in that the retaining spring is fastened on the frame 8 and moved with it. In the resting position R, all the diaphragms 9, which do not lie before the detector 1, are held by means of the electromagnets, which are fastened not on the frames 8 but on the detector 1. Finally, the frame 8, together with the diaphragms 9, which are not held by the electromagnet, are turned back. Thereby the diaphragms, which are not held by the electromagnets, are held on the frame by the retaining spring and thus move together with the frame 8.

Alternatively, the frame can also be provided with electromagnets, in which case only the diaphragms 9, which are held by the electromagnets, are moved out of the path of the beam into the resting position R. In this case, one can dispense with the bistable fixing of the individual diaphragms; fixing in the operating position A is sufficient. The diaphragm screens of the individual diaphragms 9, which point in the operating position to the direction of the incident light, as well as their rear sides, can thereby be reflective or absorptive.

It is to be understood that the present invention is not limited to the illustrated embodiments described herein. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

We claim:

1. A diaphragm device with which individual wavelengths or ranges of wavelengths in the path of a beam of spectrally dispersed light can be suppressed,
   the diaphragm device comprising:
   at least one array of at least two diaphragms, wherein the individual diaphragms of the at least one array are arranged in a mutually defined relation with respect to each other so that they may be coupled in the path of the beam, wherein the diaphragms of the at least one array include diaphragm screens, and wherein the surface areas of the diaphragm screens in the path of the beam pointing to the direction of the incidence of light are one of light absorbing and light reflecting; and
   means for arranging each diaphragm of the at least one array, in the coupled state, in a given relation to an individual wavelength or a range of wavelengths.

2. The diaphragm device according to claim 1, wherein the individual diaphragms of the array are arranged along a predetermined direction in a defined relation with respect to each other.

3. The diaphragm device according to claim 2, wherein the predetermined direction lies essentially perpendicular to an optical axis and parallel to a direction, in which the light is spectrally dispersed.

4. The diaphragm device according to claim 2, wherein the array of diaphragms is positioned in a fixed manner in the predetermined direction and the diaphragms of the arrays are coupled in the path of the beam.

5. The diaphragm device according to claim 4, wherein the diaphragms are displaceable in the path of the beam.

6. The diaphragm device according to claim 5, comprising:
   first and second arrays of diaphragms, wherein the diaphragms of the first array include diaphragm screens, and wherein the second array of diaphragms are arranged in such a manner that when pushed into the path of the beam, each one of the diaphragms of the second array covers a marginal area of a diaphragm screen of at least one of the diaphragms of the first array.

7. The diaphragm device according to claim 4, wherein the diaphragms of the arrays are arranged an at least partially rotatable manner along an axis.

8. The diaphragm device according to claim 7, wherein the axis lies parallel to the predetermined direction.

9. The diaphragm device according to claim 4, wherein the diaphragms of the array are arranged on a common frame.

10. The diaphragm device according to claim 9, further comprising means for supporting the frame on one side rotatably about the axis.

11. The diaphragm device according to claim 7, wherein, for each individual diaphragm, a resting position (R) is provided, in which the diaphragm does not lie in the path of the beam, and an operating position (A), in which the diaphragm is in the path of the beam, and wherein the diaphragm device further comprises means for fixing the diaphragm in the resting position (R) and means for fixing the diaphragm in the operating position (A).

12. The diaphragm device according to claim 11, wherein the means for fixing each of the diaphragms in the resting position (R) includes an electromagnetic holder.

13. The diaphragm device according to claim 11, wherein the means for fixing of each of the diaphragms in the operating position (A) includes a spring element having a state of elastic, tension in the resting position (R) greater than in the operating position (A).

14. The diaphragm device according to claim 11, further comprising a spring element for stabilizing of each diaphragm, the spring element having a state of elastic tension during the movement from the resting position (R) into the operating position (A) and back that is greater than in the resting and operating positions (R, A).

15. The diaphragm device according to claim 14, wherein the spring element comprises a leaf spring pressing against a rest.

16. The diaphragm device according to claim 11, comprising first and second array of diaphragms, wherein the diaphragms of the second array are so arranged that in the operating position (A), each diaphragm of the second array covers the marginal area of a diaphragm screen of at least one diaphragm of the first array.

17. The diaphragm device according to claim 1, further comprising a beam trap for capturing the light reflected from the diaphragm screens.

* * * * *